United States Patent [19]

Dante

[11] 4,108,824
[45] Aug. 22, 1978

[54] LOW-TEMPERATURE CURABLE SATURATED EPOXY RESIN COMPOSITIONS

[75] Inventor: Mark F. Dante, Houston, Tex.

[73] Assignee: Shell Oil Company, Houston, Tex.

[21] Appl. No.: 814,369

[22] Filed: Jul. 11, 1977

[51] Int. Cl.² .......... C08G 59/02; C08K 5/05; C08K 5/15

[52] U.S. Cl. .......... 260/33.2 EP; 260/33.4 EP; 528/88; 528/123; 528/122; 528/121; 528/407

[58] Field of Search ......... 260/2 N, 33.2 EP, 33.4 EP

[56] References Cited

U.S. PATENT DOCUMENTS

| | | | |
|---|---|---|---|
| 3,331,788 | 7/1967 | Lorensen et al. | 260/2 N |
| 3,336,241 | 8/1967 | Shokal | 260/2 A |
| 3,374,186 | 3/1968 | Steden et al. | 260/2 N |
| 3,509,229 | 4/1970 | Shimp et al. | 260/33.4 EP |
| 3,519,602 | 7/1970 | Castro et al. | 260/2 N |
| 3,519,603 | 7/1970 | Lohse et al. | 260/2 N |
| 3,578,616 | 5/1971 | Harry | 260/33.2 EP |
| 3,639,344 | 2/1972 | Kinneman et al. | 260/2 N |
| 3,645,969 | 2/1972 | Harvey | 260/33.2 EP |
| 3,794,609 | 2/1974 | Metil | 260/33.2 EP |

*Primary Examiner*—Herbert J. Lilling
*Attorney, Agent, or Firm*—Norris E. Faringer

[57] ABSTRACT

Low-temperature curing epoxy compositions are described comprising (1) a saturated epoxy resin, (2) a curing amount of certain aliphatic amines and (3) an organic solvent selected from the group consisting of alcohols, glycols, and glycol ethers.

7 Claims, No Drawings

LOW-TEMPERATURE CURABLE SATURATED EPOXY RESIN COMPOSITIONS

BACKGROUND OF THE INVENTION

It is generally known that epoxy resins such as the diglycidyl ethers of 2,2-bis(4-hydroxyphenyl) propane can be cured with aliphatic and aromatic amines to produce acceptable coatings. It is also known that with the use of aliphatic amines, low-temperature curing systems can be obtained. When, however, saturated epoxy resins are reacted with aliphatic amines, the resulting coatings do not cure, i.e., they remain wet or tacky for extended periods of time. It would therefore be desirable to produce tough hard films using saturated epoxy resins and aliphatic amines at low-baking temperatures. Accordingly, a process has now been discovered which produces ambient-curable saturated epoxy compositions.

SUMMARY OF THE INVENTION

The present invention provides curable epoxy coating compositions prepared by reacting a saturated epoxy resin with a curing amount of an aliphatic amine for from about 15 to 60 minutes in the presence of an organic solvent selected from the group consisting of alcohols, glycols and glycol ethers, before applying the composition to a suitable substrate.

DESCRIPTION OF THE PREFERRED EMBODIMENT

In general, the present compositions provide excellent, hard, tough coatings and are prepared by pre-reacting (1) a saturated epoxy resin with (2) a curing amount of an aliphatic amine in the presence of (3) an organic solvent, i.e., alcohols and glycol ethers. In other words, the instant compositions are simply prepared by pre-reacting the components for a period of from about 15 to 60 minutes at ambient temperature. This pre-reaction period is sometimes referred to as the "sweat-in" time. After the components have pre-reacted for a sufficient sweat-in time, the resulting one-package composition is applied to a suitable substrate and cured to produce a uniform, hard, tough surface coating or film.

SATURATED EPOXY RESINS

The epoxy compounds useful in the present compositions include those compounds derived from polyhydric phenols and having at least one vicinal epoxy group wherein the carbon-to-carbon bonds within the six-membered ring are saturated. Such epoxy resins may be obtained by two well-known techniques, i.e., (1) by the hydrogenation of glycidyl polyethers of polyhydric phenols, or (2) by the reaction of hydrogenated polyhydric phenols with epichlorhydrin in the presence of a Lewis Acid catalyst and a subsequent dehydrochlorination in an alkaline medium. The method of preparation forms no part of the present invention and the resulting saturated epoxy resins derived by either method are suitable in the present compositions.

Briefly, the first method comprises the hydrogenation of glycidyl polyethers of polyhydric phenols with hydrogen in the presence of a catalyst consisting of rhodium or ruthenium supported on an inert carrier at a temperature below about 50° C. This method is thoroughly disclosed in U.S. Pat. No. 3,336,241, and is suitable for use in preparing saturated epoxy resins. Accordingly, the relevant disclosure of U.S. Pat. No. 3,336,241 is incorporated herein by reference.

The second method comprises the condensation of a hydrogenated polyphenol with an epihalohydrin, such as epichlorohydrin, in the presence of a suitable catalyst such as $BF_3$, followed by the dehydrohalogenation in the presence of caustic. When the phenol is hydrogenated bisphenol A, the resulting saturated epoxy compound is sometimes referred to as "diepoxidized hydrogenated bisphenol A", or more properly as the diglycidyl ether of 2,2-bis(4-cyclohexanol)propane.

In any event, the term "saturated epoxy resin", as used herein shall be deemed to mean the glycidyl ethers of polyhydric phenols wherein the aromatic ring structure of the phenols is or has been saturated.

An idealized structural formula representing the preferred saturated epoxy compounds is as follows:

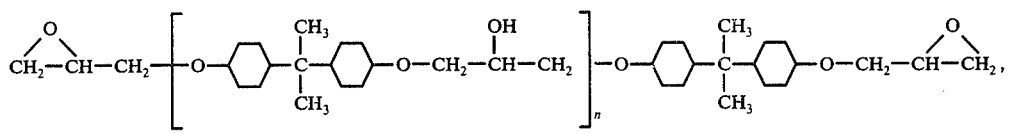

wherein $n$ has a value so that the average molecular weight of the saturated polyepoxide is from about 350 to about 2500.

ALIPHATIC AMINES

The aliphatic amines which are useful to prepare the instant compositions comprise the aliphatic amines having the general formula

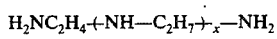

wherein $x$ is an integer from zero to 6.

Examples of suitable aliphatic amines included, among others, ethylenediamine (EDTA), diethylenetriamine (DTA), triethylene tetraamine (TETA), and tetraethylene pentaamine (TEPA).

ORGANIC SOLVENTS

Suitable solvents include the aliphatic alcohols and glycols containing up to about 6 carbon atoms and at least one OH group. Examples of such solvents include methanol, ethanol, propanol, isopropanol, n-butanol, iso-butanol, hexanediol, ethylene glycol and propylene glycol.

Other suitable solvents include the so-called glycol ethers such as the methyl, ethyl and butyl ethers of ethylene glycol or propylene glycol. Such glycol ethers are commercially available under the trade designation of OXITOL® such as methyl OXITOL® Glycol ether; CELLOSOLVE® and methyl CELLOXOLVE®; and PROPASOL® B.

The instant compositions are conveniently prepared by reacting the saturated epoxy resin with approximately a stoichiometric amount of the aliphatic amine, although a slight excess of either reactant may be employed under certain circumstances. In general, up to about a 20% excess may be employed. Sufficient organic solvent is used to produce a system having up to 98% by weight binder or vehicle (epoxy-amine adduct). Expressed another way, at least 2% by weight of alcohol, or glycol, or glycol ether is required. Preferably, the solution will contain from about 25 to 95% by weight binder or vehicle.

The reaction is performed at ambient temperatures, i.e., from about 15° to 30° C, for a period from about 15 to 60 minutes. This reaction time or period will sometimes be referred to herein as the "sweat-in" time.

Before or during a suitable sweat-in period, conventional additives such as pigments, fillers, etc., may be added and resulting formulation applied by suitable means to a substrate and the coating or film cured.

In general, if a pigmented system is desired, one or more pigments conventionally employed in surface coatings may be added to produce a pigment volume concentration of from about 15 to 25%.

The present coating compositions may be applied to a suitable substrate by any suitable means such as spraying, dipping, painting, doctor blade, or the like. The thickness of the film will depend on many circumstances, particularly the end-use of such baked coatings, e.g., as primers or as surface coatings.

The applied coating can be cured at ambient temperature or at higher temperatures. In general, the film will cure in 7 to 10 days at ambient (room) temperature, i.e., so-called "air-dry" cure. On the other hand, the film can be conveniently cured by baking at 80° to 120° C for 10 to 30 minutes. A very acceptable cure cycle is 20 minutes at 93°–95° C.

The advantages of the instant compositions are illustrated by the following illustrative examples. The reactants, their proportions, and other specific ingredients are presented as typical and various modifications can be made in view of the foregoing disclosure and discussion without departing from the spirit or scope of the disclosure or of the claims. Unless otherwise specified, parts and percentages are by weight.

EXAMPLE I

This example illustrates the effect of various solvents and sweat-in periods.

The following components were mixed together and after various sweat-in periods, the formulation was applied to cold rolled steel panels. Some panels were air dried for 7 days at ambient (room) temperature and other panels were baked at 200° F for 20 minutes. Various organic solvents were used in the formulations. The results of the evaluation of the resulting cured coatings are tabulated in Table I.

| Formulation: Component | Parts by Weight |
|---|---|
| Epoxy resin (a diglycidyl ether of hydrogenated BPA having an idealized structure noted hereinbefore and having a WPE of about 234 and an average molecular weight of 460–470) | 100 |
| Organic solvent | 25 |
| Diethylenetriamine (DETA) | 8 |

TABLE I

A. Film Properties at 7-Day Air Dry

| | | Sweat-in Period | | |
|---|---|---|---|---|
| Run No. | Solvent | None | ½ Hour | 1 Hour |
| 1 | MEK[1] | No Cure (NC) | NC | NC-wet |
| 2 | NBA[2] | NC | Tack-free | Cured Fingernail soft |
| 3 | 2-ethoxy-ethanol[3] | NC | Dust-free | Cured |
| 4 | None | NC | NC | Very slightly tacky |

B. Film Properties at 200° F bake for 20 minutes

| | | Sweat-in Period | | |
|---|---|---|---|---|
| Run No. | Solvent | None | ½ Hour | 1 Hour |
| 5 | MEK | NC | Tacky | Tacky |
| 6 | NBA | NC | Cured | Cured |
| 7 | 2-ethoxy-ethanol | NC | Cured | Cured |
| 8 | None | NC | Tacky | Cured |

[1] MEK - methyl ethyl ketone
[2] NBA - normal butyl alcohol
[3] Oxitol ® Glycol Ether

EXAMPLE II

This example illustrates the effectiveness of various amines in a solventless system.

The procedures of Example I were essentially repeated wherein equivalent amounts of various amines are used and no solvent is employed.

The results of the evaluation of the air-dried and baked films are tabulated in Table II.

The data clearly indicate that the use of DETA without solvent fails to produce an acceptable film either by air-drying or by baking, although several other amino-containing compounds produced hard, air-dry and baked coatings.

TABLE II

| | Pre-reaction Period | | | | | |
|---|---|---|---|---|---|---|
| | None | | 30 Minutes | | 60 Minutes | |
| Amine | Cure A[1] | Cure B[2] | Cure A | Cure B | Cure A | Cure B |
| Polyamide[3] | Tacky | Wet | Tacky | Wet | Tacky | Wet |
| Amido-Amine[4] | Tacky | Wet | Tacky | Hard | Tacky | Hard |
| HMDA[5] | NA | NA | NA | NA | Wet | Hard |
| PACM-20[6] | Hard | Hard | Hard | Hard | Hard | Hard |
| DETA[7] | Wet | Wet | Wet | Wet | Wet | Wet |

[1] Cure A: 200° F for 20 minutes
[2] Cure B: 7 days air dry at room temperature
[3] Polyamide: EPON Curing Agent V-40
[4] Amido-Amine: EPON Curing Agent V-50
[5] HMDA: Hexamethylenediamine
[6] PACM-20 (E.I. duPONT): Bis(aminocyclohexyl)methane
[7] DETA: diethylenetriamine

EXAMPLE III

This example illustrates the effect of various organic solvents in the present compositions.

The procedures of Example I were essentially repeated wherein various solvents were used. The aliphatic amine is DETA.

The evaluation of the resulting films is tabulated in Table III.

TABLE III

| Solvent | No "Sweat" Cure A[1] | No "Sweat" Cure B[2] | 30 Minutes Cure A[1] | 30 Minutes Cure B[2] | 1 Hr. Cure A[1] | 1 Hr. Cure B[2] | Gel Time, Hrs. |
|---|---|---|---|---|---|---|---|
| Toluene | Wet | Wet | Wet | Wet | Wet | Wet | 25:00 |
| Xylene | " | " | " | " | " | " | >7:00 |
| VM & P Naptha | " | " | " | " | " | " | >7:00 |
| MEK[3] | " | " | " | " | " | " | >48:00 |
| MIBK[4] | " | " | " | " | " | " | >48:00 |
| 100% n-Butyl Acetate | " | " | " | " | " | " | 26:00 |
| 2-ethoxy-ethanol | " | " | " | " | Hard | Hard | >7:00 |
| Isopropanol | " | " | Partially Hard | " | " | " | 3:30 |
| N-butyl Alcohol | " | " | Tacky | " | " | " | >2:30 |
| None | " | " | Wet | " | Wet | Wet | — |

[1] Cure A: 200° F for 20 minutes
[2] Cure B: Air dry at room temperture for 7 days
[3] MEK: Methyl ethyl ketone
[4] MIBK: Methyl isobutyl ketone

EXAMPLE IV

This example illustrates the use of normal butanol in the presence of DETA and other amines. The procedures of Examples I to III were essentially repeated and the results are tabulated in Table IV.

TABLE IV

| Amine | No "Sweat" Cure A | No "Sweat" Cure B | 30 Minutes Cure A | 30 Minutes Cure B | 1 Hour Cure A | 1 Hour Cure B |
|---|---|---|---|---|---|---|
| Polyamide | Tacky | Wet | Tacky | Wet | Hard | Wet |
| Amido-amine | " | " | " | " | " | " |
| HMDA | " | Hard | " | Hard | " | Hard |
| PACM-20 | Hard | " | Hard | " | Hard | " |
| DETA | Wet | Wet | Tacky | Wet | " | " |

EXAMPLE V

This example illustrates the effect of alcohol concentration upon cure of the epoxy resin of Example I with DTA in the presence of normal-butyl alcohol. The procedures of Examples I to IV were essentially repeated and the results are tabulated in Table V.

TABLE V

| % Alcohol | No "Sweat" Cure A[1] | No "Sweat" Cure B[2] | 30 Minutes Cure A | 30 Minutes Cure B | 60 Minutes Cure A | 60 Minutes Cure B |
|---|---|---|---|---|---|---|
| 0 | NC | NC | NC | NC | Slightly Tacky | NC |
| 1 | " | " | " | " | " | " |
| 2 | " | " | " | " | Cured | Very Slightly Tacky |
| 5 | " | " | " | " | " | Cured |
| 10 | " | " | " | " | " | " |
| 20 | " | " | " | Cured | " | " |

[1] Cure A = 20 minutes at 93° C
[2] Cure B = 3 days at room temperature
[3] N-butyl Alcohol

EXAMPLE VI

Related results are observed when the saturated epoxy resin is a glycidyl ether of 2,2-bis(4-cyclohexanol)propane.

What is claimed is:

1. A curable composition prepared by reacting a saturated epoxy resin with a curing amount of an aliphatic amine for from about 15 to 60 minutes in the presence of an organic solvent selected from the group consisting of aliphatic alcohols, glycols, and glycol ethers, and wherein the weight ratio of the epoxy resin - amine adduct to organic solvent is from 25:75 to 95:5.

2. The composition of claim 1 wherein the saturated epoxy resin is a hydrogenated glycidyl ether of 2,2-bis(4-hydroxyphenyl)propane.

3. The composition of claim 1 wherein the saturated epoxy resin is a glycidyl ether of 2,2-bis(4-cyclohexanol)propane.

4. The composition of claim 1 wherein the aliphatic amine have the general formula:

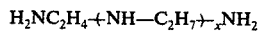

$$H_2NC_2H_4 + NH - C_2H_7 +_x NH_2$$

wherein $x$ is an integer from zero to 6.

5. The composition of claim 4 wherein the aliphatic amine is diethylenetriamine.

6. The composition of claim 1 wherein the organic solvent is an aliphatic alcohol containing up to 6 carbon atoms.

7. The composition of claim 1 wherein the organic solvent is a glycol ether.

* * * * *